Figure 1:
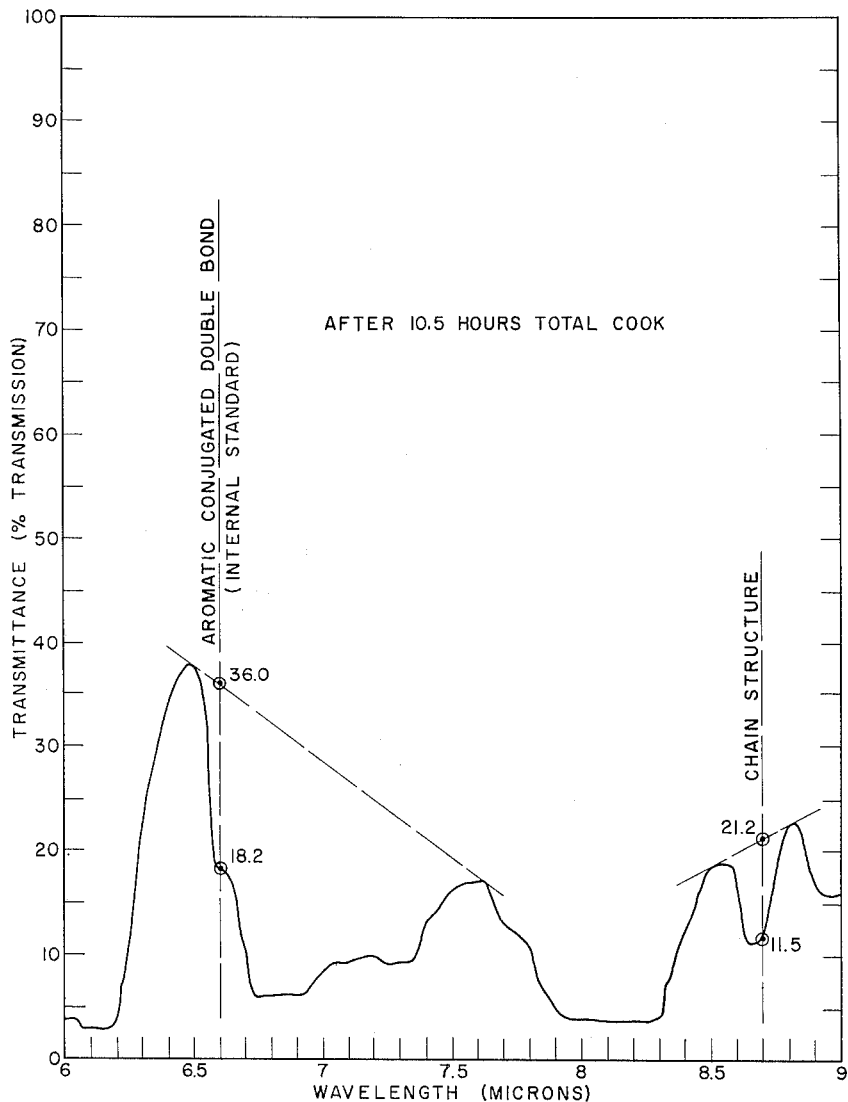

April 26, 1966     P. F. BIEFELD     3,248,368
PRODUCTION OF CURABLE PHENOLIC RESIN
Filed May 16, 1961     3 Sheets-Sheet 1

INVENTOR.
PAUL F. BIEFELD
BY
ATTORNEYS

INVENTOR.
PAUL F. BIEFELD

United States Patent Office 3,248,368
Patented Apr. 26, 1966

3,248,368
PRODUCTION OF CURABLE PHENOLIC RESIN
Paul F. Biefeld, Newark, Ohio, assignor to Owens-Corning Fiberglas Corporation, a corporation of Delaware
Filed May 16, 1961, Ser. No. 110,400
7 Claims. (Cl. 260—57)

This invention relates to the production of curable phenolic resinous condensation products and in particular to processes of manufacture of curable phenolformaldehyde resins condensation products in which a cooking at an initial temperature of a phenol-formaldehyde-catalyst reactant mixture is followed by additional cooking at a different, usually higher temperature conducive to condensation to the required extent. More particularly, the invention relates to an improved method for carrying forth such processes in which samples of the reactant mixture are taken during the cooking and durations of cookings at various temperatures are determined and controlled in accordance with certain adjusted infrared absorbence values of such samples.

Phenolic resinous condensation products, and more specifically, phenol-formaldehyde resins, processes for their production, and equipment for manufacture thereof are well known. Commercially, two main types of reactions, involving different ratios of phenol to formaldehyde with acid and alkaline catalysts, respectively, are employed to produce commercially important curable phenol-formaldehyde resins. Through use of various reactants, catalysts, and proportions of each, and control of reaction conditions and the like, curable resins of different properties and types are obtained. In the presence of basic catalysts, such as sodium hydroxide, calcium hydroxide, tertiary amines, ammonia and the like, and more than one mole of formaldehyde per mole of phenol, phenol and formaldehyde condense to form a phenolic resole or an A-stage resin which is fusible and soluble in alkalis. Such resoles upon further advancement of the reaction, proceed to a B-stage, where they are called resitols, and upon still further advancement of the reaction proceed to resites or C-stage resins, which are relatively insoluble and infusible products. If a ratio of less than one part of formaldehyde to phenol is used along with an acidic catalyst, there is formed a phenolic novolac, which is permanently fusible. If desired, additional formaldehyde is added to enable thermal conversion of novolac to an insoluble infusible product. Alternatively, a curing agent, such as paraformaldehyde, or hexamethylenetetramine which under heat or pressure yields formaldehyde and ammonia, can be added to enable the conversion with the ammonia serving as a catalyst and the formaldehyde furthering the reaction to a cured resin. Novolacs are referred to as two-stage resins, and are capable of producing relatively infusible and insoluble products. Variations of both acidic and basic catalyst processes are known using acidic and basic catalysts at various stages in the reaction and have found some commercial importance. For example, a basic catalyst is used in producing a resole which then is converted to a novolac through use of an acidic catalyst and additional phenol, or an acidic catalyst is used in producing a novolac which then is converted to a resole through use of a basic catalyst and additional formaldehyde. Commercially, the manufacturer of curable phenolic resins carries the phenol-formaldehyde condensation reaction to a state short of a relatively infusible insoluble product, i.e. to a curable phenolic resin. For example, the resin manufacturer may arrest the condensation reaction at either the A- or B-stage for the resole, or he may arrest the reaction at the fusible stage for the novolac or at a stage where the novolac, upon the addition of additional formaldehyde and/or curing agent, is somewhat short of being a relatively infusible and insoluble product. The end user of the curable phenolic resinous condensation product, then employs a not fully cured phenol resinous condensation product and cures such product further to form, mold, coat, impregnate and the like, the particular article he is preparing by exemplary techniques, such as molding under heat and pressure.

The chemistry of the condensation reaction leading to the final cured phenol-formaldehyde resinous condensation product is complex and involved. In taking a somewhat simplified and concise approach for purposes of furthering an understanding of the invention, it generally is recognized in both the acid and alkaline catalyzed condensation of phenol and formaldehyde, that initial reaction yields a complex mixture which includes intermediates having methylol groups attached to the phenol, and upon further reaction that cross linking, by methylene bridge formation, takes place to yield the insoluble and infusible product. For example, formation of the parahydroxy alcohol of phenol occurs in alkaline medium and upon dehydration by acid catalysts or heat this alcohol condenses to resinous products containing methylene bridge linkages. Methylol alcohols, such as saligenin, have been identified in the early stages of the alkaline condensation and compounds of the dihydroxydiarylmethane type, such as 4,4'-dihydroxydiphenylmethane, and 2,4'-dihydroxydiphenylmethane, have been identified in various stages of the acid condensation. Due to the complex nature of the reaction, both phenol alcohol formation and cross linkage formation, both probably take place throughout substantially the entire condensation reaction with the greatest proportion of the phenol alcohol formation occurring in the initial and early stages of the reaction and with the greatest proportion of the cross-linkage formation phase of the condensation occurring in the latter stages of the overall reaction.

Phenolic resin manufacturers in their production of curable resinous condensation products seek to produce resins of substantially uniform quality. In production of numerous batches of a particular curable phenolic resin, the resin manufacturer desires and seeks to maintain a substantially uniform quality curable resinous condensation product. That is, there are desired resins of substantially the same properties which will be capable of molding, curing and the like, under those conditions previously employed with supposedly identical resins produced in the supposedly identical manner and, when so used and so incorporated into an article, will provide properties for the article substantially the same as provided by previously used supposedly identical curable resins.

As is apparent, the resin manufacturer is beset by many problems in producing and maintaining a uniform quality curable resinous condensation product. Not only is care necessary in identification and maintenance of uniform quality of reactants, catalysts and the like, but the amounts thereof reacted, and the conditions used for the condensation reaction also require careful control to provide uniform quality curable phenolic resinous condensation products having the required extent of condensation. Duration of the reaction time at the cooking temperatures used is important in that the condensation reaction should be maintained in a manner consistently to produce the same quality curable phenolic resinous condensation product. Practice in the past has been to establish, usually by experimental runs or by trial and error methods, suitable conditions, such as cooking time, for the condensation reaction, and then in subsequent resin production to try to hold these conditions as uniform and constant as practical while also attempting to control all other possible variables, such as process temperature, reactant purities, amounts of reactant, and the like, the same as or as close as possible to those of earlier satisfactory production runs. If ideal production controls and practices could be established and maintained, such methods consistently would yield substantially identical curable resins from one preparation to the next. However, instrumentation errors, equipment malfunction and/or failure, and human errors are possible, do creep in, and frequently exist, so that differences and variances do exist and are found in the supposedly identical quality curable resins. These variances and differences are a source of trouble to the user of the curable resin who also is seeking to maintain a constant and uniform standard of quality in the articles produced from the curable resins.

In following the course and advancement of the condensation reaction so that condensation may be effectively arrested when the desired curable phenolic resin is obtained, many means have been used to control the condensation reaction. For example, measurements of the depletion of formaldehyde, of pH changes of the reactant mixture during the course of the condensation reaction, of the viscosity changes in the reactant mixture as condensation proceeds, of a turbidity or cloudiness point which is based on changes in solubility of various reaction products and the like formed during the condensation reaction, are just a few of such means and well illustrate the effort and importance attached by the resin manufacture to a control of the condensation reaction to obtain uniform quality curable phenolic resinous condensation products.

When radiant energy passes through a medium, a certain amount of the radiant energy is absorbed. Infrared spectroscopy relies primarily on the fact that practically all organic substances at certain frequencies or wave lengths in the infrared spectrum possess selective absorption bands, which bands usually are uniquely distinctive and characteristic of a particular substance. Studies and comparisons of large numbers of pure compounds have shown that infrared absorption bands at certain frequencies or wave lengths can be correlated with certain bond linkages or functional and atomic groups in the molecule and that such bands are relatively independent of the constitution of the balance of the molecule.

Infrared absorption studies in the phenolic art have been used primarily to identify structure and structural features of intermediates and reaction products and to enlarge on the knowledge of a probable course of the condensation reactions. Such infrared absorption studies have furthered an understanding of the condensation reaction and have supplied evidence that: phenol alcohols and the like are found in the reactant mixture during the condensation of phenol and formaldehyde; the hydroxyl groups of saligenin and such phenol alcohols should be capable of intramolecular bonding; marked differences exist in 2,2-dihydroxy-diphenolmethanes when compared to the 2,4'- and 4,4'-structures; some unreacted phenol is found in typical phenol alcohols and phenolic resins; and other revealing information and data of a like nature, all of which is helpful in revealing a probable course and mechanism of the phenol-formaldehyde condensation reaction.

Whatever may be the true mechanism and course of the condensation reaction that takes place between phenol and formaldehyde, it now has been discovered that changes in certain adjusted infrared absorbence values of the reactant mixture during the course of reaction are highly useful in varying the duration of cooking of the reactant mixture so as to provide highly desirable, relatively uniform quality, curable phenolic resinous condensation products.

It is an object of this invention to provide an effective method for producing curable phenol-formaldehyde resinous condensation products.

It is another object of the invention to provide a method for producing curable phenol-formaldehyde resinous condensation products, which method includes taking samples of the reactant mixture and varying of the duration of the cooking in accordance with adjusted infrared absorbence values of the samples.

A further object is to provide a method of producing phenol-formaldehyde resins in which method samples of the reactant mixture are taken at spaced intervals of time during initial cooking of the reaction mixture and in which there is an increasing of the initial cooking temperature and cooking at a higher cooking temperature substantially immediately after the taking of the sample having a particular end-group adjusted infrared absorbence value.

Still a further object is to provide a method of producing phenol-formaldehyde resins in which method samples of the reactant mixture are taken at spaced intervals of time while the reactant mixture is at a cooking temperature conducive to condensation to the required extent and in which the reaction mixture is cooled substantially immediately after taking of the sample having a particular chain-structure adjusted infrared absorbence value.

Figure 2:
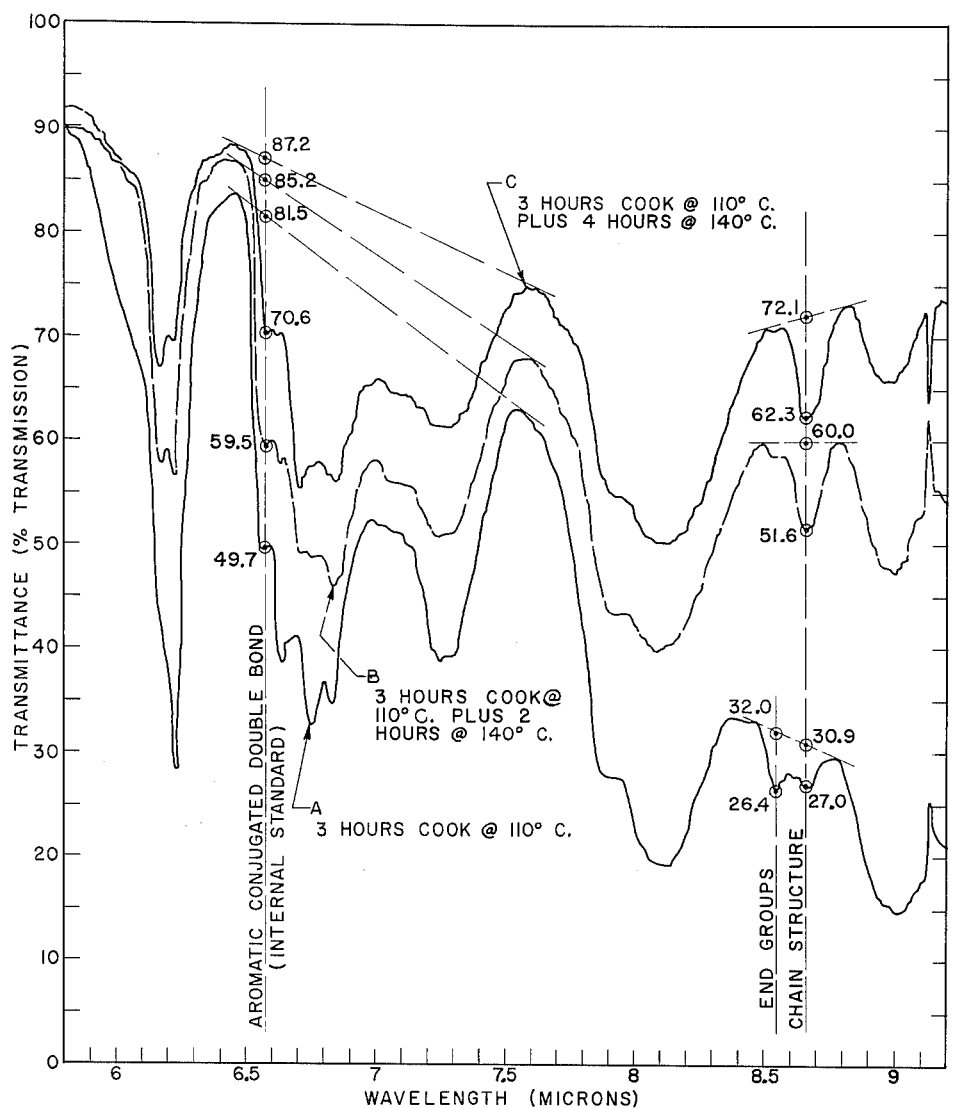
Figure 3:
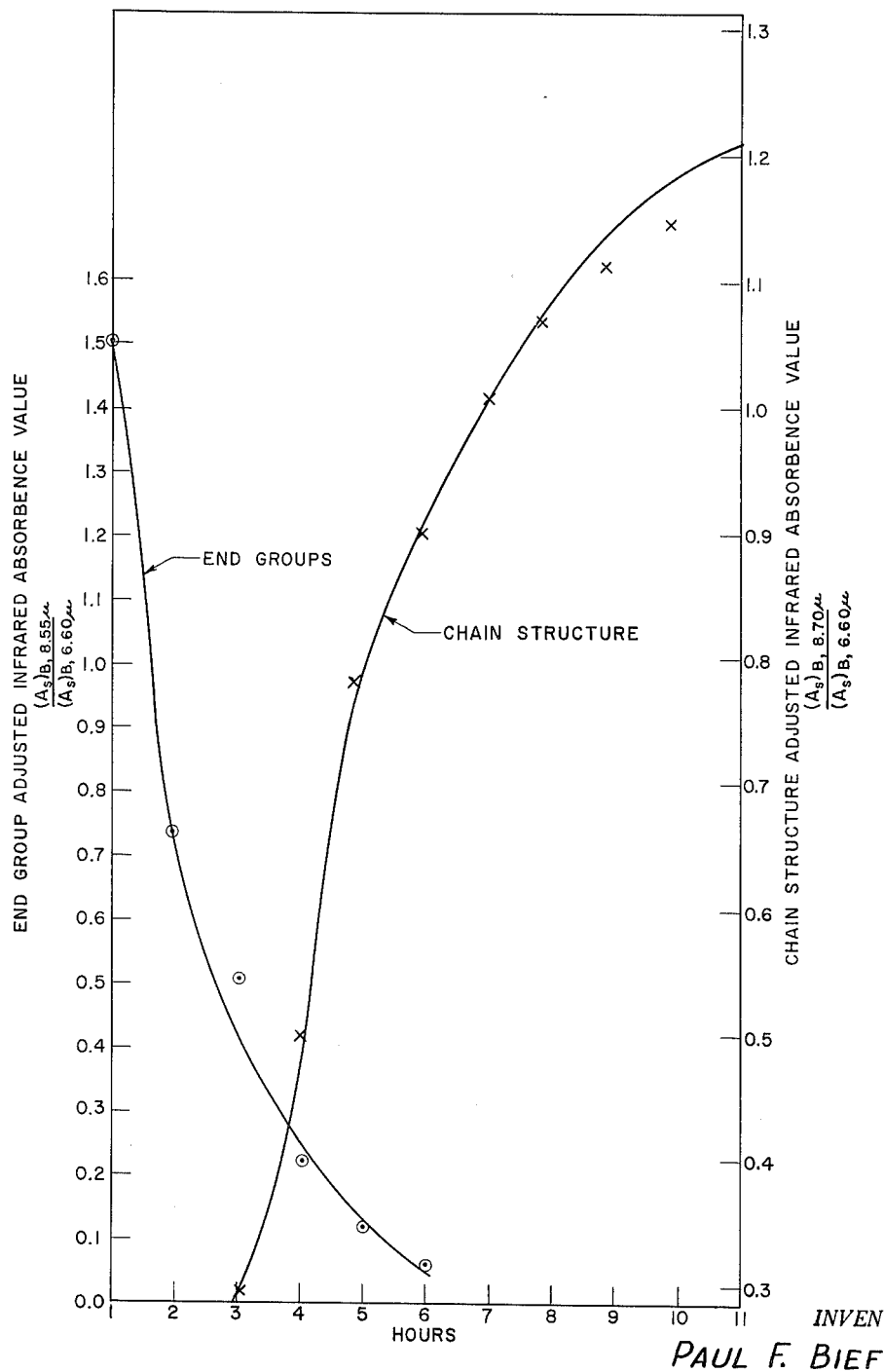

Other objects and advantages will be apparent from the description which follows, reference being made to the accompanying drawing in which:

FIG. 1 is a tracing of a portion of the infrared absorption band spectrum for a reactant mixture sample taken during the production of phenolic resole before condensation has proceeded to a desired extent;

FIG. 2 is a tracing of portions of several infrared absorption band spectra for reactant mixture samples taken during the production of a phenolic resole at several intermediate stages of condensation short of a desired extent of condensation; and FIG. 3 is a plot of the adjusted infrared absorbence values of distinctive characteristic absorption bands for end groups at about 8.55 microns wave length and chain structure at about 8.70 microns wave length with reference to a distinctive characteristic internal standard absorption band at about 6.60 microns wavelength, and illustrates the changes in values throughout the course of a condensation reaction in which there is produced a particular phenolic resole.

By use of the process of the inventon many difficulties of the prior art are overcome. The producer of curable phenolic resins is able to determine and maintain an optimum cooking cycle and thus produce consistently a uniform quality product. The invention is a process of producing curable phenol-formaldehyde resinous condensation products. Samples of a reactant mixture are taken during the cooking, and such cooking conditions as duration of cooking and cooking temperatures are altered substantially immediately after the taking of a sample having a particular predetermined adjusted infrared absorbence value. In the practice of the invention the cooking of a mixture of phenol, formaldehyde and a catalyst or condensing agent is changed from a cooking at a relatively low reaction temperature to a cooking at a higher reaction temperature substantially immediately after the taking of a sample of a reactant mixture having a particular predetermined end group adjusted infrared absorbence value. Also, the cooking of a phenol-formaldehyde-catalyst mixture is discontinued and the reaction mixture is quickly cooled to arrest the condensation reaction substantially immediately after the taking of a sample of the reactant mixture having a particular predetermined chain structure adjusted infrared absorbence value.

To practice the invention, there is made at least one process run which will produce the desired particular type phenolic resin having the particularly desired properties. Samples taken periodically during the reaction condensation portion of this process run are subjected to infrared analysis. Examination and comparisons are made of the recorded absorption spectra of the samples of the reaction mixture taken periodically during the course of the condensation reaction producing the desired type of phenolic resin having the desired properties. These recorded spectra show at least several absorption bands which change characteristically throughout the course of the condensation reaction. There are selected several of these absorption bands which change during the course of the condensation reaction with those particular absorption bands which are characteristic of intermediates and end product and which progressively increase or decrease during various portions of the entire course of the condensation reaction being preferred selections to show the progress and advancement of the condensation reaction. Particularly useful in resole production processes is the characteristic absorption band at about 8.55 microns which band is distinctive and characteristic of 2 and 4 substitution on the aromatic nuclei of phenol. In resole production this band increases regularly and rapidly during the early stages of the condensation, thus indicating the addition of methylol groups to phenol, and then the rate of increase tapers off as condensation proceeds. This characteristic absorption band at about 8.55 microns is a preferred characteristic end group absorption band for practice of the invention. Also particularly useful in resole production processes is the characteristic absorption band at about 8.70 microns, which band is distinctive and characteristic of 2, 6 and 2, 4, and 2, 4, 6 substitution on the aromatic nuclei of phenol. This band at 8.70 microns becomes measurable shortly after the reaction commences and increases progressively during the middle and later stages of the condensation reaction, thus indicating condensations at the 2, 6 and 2, 4 and 2, 4, 6 positions of the aromatic nuclei of phenol. This band at 8.70 microns is a preferred characteristic chain-structure absorption band in the practice of the invention for control of the latter portion of a condensation reaction producing a resole.

Other absorption bands are distinctive and characteristic of various functional groups which alter during the course of the reaction and will be apparent to those skilled in the art from an examination of several infrared spectrums made during the course of the condensation reaction. These other distinctive absorption bands which change in intensity and peak height during the course of the condensation reaction also are useful. For example, absorption bands showing changes in the monomeric reactants, such as the absorption band at about 14.45 microns which is characteristic of free phenol, are useful. This band at 14.45 microns decreases as the concentration of free phenol diminishes during the course of the condensation reaction. Similarly, with the band at about 13.2 microns, which is indicative of 1,2- and 1,2,6-substituted benzene, and also free phenol, the course of the condensation reaction may be followed. With novolacs, wherein substitutions at the 1,2,4 position of the aromatic nucleus are more oustanding than in resoles, characteristic bands at about 11.35 and 12.3 microns are useful. Other characteristic infrared absorption bands changing during the course of condensation reactions producing various types of phenolic resins will be apparent from the teachings of the present invention, and also are useful. Difficulty arises due to the complexity of the reactant mixture, if one attempts to rely solely on one particular characteristic absorption band or even a base line absorbency of this band as a quantitative indication of the progress of the course of the condensation reaction. Absorption bands are influenced by such factors as sample cell thickness, changes in concentration of the reactants in the reactant mixture, including the formation of the resin itself, color of the sample, and interference of other absorption bands. Thus, if one is to rely only on one particular characteristic absorption band or on a base line absorbency thereof for following the course of the reaction, such extreme care is necessary to eliminate or minimize various influencing factors that as a practical matter these absorption bands are not useful for a direct control of the condensation reaction process.

An essential element in practice of the invention is that characteristic absorption bands or their base line absorbencies per se are not employed individually for following the course of a condensation reaction. Instead, the present invention relies on combinations of base line absorbencies in the form of what has been termed adjusted infrared absorbence values to follow the course of the condensation reaction and to alter condensation reaction conditions accordingly. An adjusted infrared absorbence value is the ratio of the base line infrared absorbence at a wave length which reflects a particular changing characteristic functional group to the base line infrared absorbence of a particular relatively constant characteristic functional group. Illustrative of an infrared band of a characteristic functional group which is relatively constant during the course of the condensation reaction is that at about 6.60 microns which indicate the aromatic conjugated carbon-to-carbon double bond. In the invention, such a relatively non-changing characteristic infrared absorption band is an internal standard. This internal standard minimizes or eliminates troublesome difficulties encountered when attempting to use only one particular changing characteristic band or the base line absorbency thereof to control the condensation reaction, and thus makes the adjusted infrared absorbence value a practical means for following and controlling the course of the reaction. The 6.60 micron infrared absorption band is a preferred internal standard for purposes of the invention and serves as a denominator to determine the adjusted infrared absorbence values employed in the practice of the invention. By employment of adjusted infrared absorbence values, for all practical purposes, the discrepancies encountered from using only a single absorption band or a single base line absorbency are avoided. Since the internal standard or denominator of the adjusted infrared absorbence value is determined on the same sample as that from which the numerator is determined, such sources of error as color, concentration, and the like, substantially cancel out in the ratio, which is the adjusted infrared absorbence value. Thus, no correction is necessary to compensate for variations in color, for changes in concentration of reactive resin concentration, and the like. Sources of error are minimized or avoided sufficiently to make the adjusted infrared absorbence value a highly useful and practical means for controlling and adjusting the condensation reaction conditions to yield consistently uniform quality phenolic resins.

While the relatively constant 6.60 micron infrared absorption band is a preferred internal standard band for purposes of the invention, other characteristic infrared absorption bands are also relatively constant during the course of the condensation reaction. For example, the absorption bands at about 3.0 microns, which is characteristic of the hydroxyl group, and that at about 6.23 microns, which is characteristic of carbon to carbon conjugated double bond linkages, and others which will be obvious to one skilled in the art are of utility in the practice of the present invention.

In determination of the adjusted infrared absorbence values of samples of the reaction mixture taken during the course of the condensation reaction, use is made of conventional infrared recording spectrophotometer to record infrared absorption over a particular infrared spectrum of interest, generally over the 6 to 9 microns wave length range. Once infrared absorption bands have been determined, selections are made of an absorption band, which changes as the course of the condensation reaction proceeds, and of a relatively constant absorption band, which is to be the internal standard. Then, from these selected or predetermined infrared absorption bands and their values, the adjusted infrared absorbence values are determined.

What is referred to herein and in the appended claims as the adjusted infrared absorbence value is the ratio of the base-line absorbency of a particular absorption band which changes characteristically during the condensation reaction to the base line absorbency of an internal standard absorption band which is relatively constant during the course of the condensation reaction. The adjusted infrared absorbence value is expressed by the following formula:

$$\frac{\log_{10}\frac{I_{B,x}}{I_x}}{\log_{10}\frac{I_{B,Std.}}{I_{Std.}}} = \frac{(A_s)_{B,x}}{(A_s)_{B,Std.}} = \text{Adjusted Infrared absorbence Value}$$

$I_{B,x}$=distance on recorded spectrum from the zero line to a straight line which is a base line joining two predominant spectral points located one on each side adjacent to the selected changing characteristic absorption band, designated $x$.

$I_x$=distance on recorded spectrum from the zero line to the selected characteristic absorption peak, designated $x$.

$I_{B,Std.}$=distance on recorded spectrum from the zero line to a straight line which is a base line joining two predominant spectral points located one on each side adjacent to the selected relatively constant and internal standard characteristic absorption band, designated Std.

$I_{Std.}$=distance on recorded spectrum from the zero line to selected characteristic internal standard absorption peak, designated Std.

$(A_s)_{B,x}$=base line absorbency for the changing $(x)$ absorption band.

$(A_s)_{B,Std.}$=base line absorbency for the internal standard (Std.) absorption band.

In the adjusted infrared absorbence values "$x$" signifies and is usually identified by the wave length or freqency of the particular predetermined characteristic infrared absorption band which is characteristic of a structural or functional group which changes during the condensation reaction. In the infrared absorption coefficient "Std." signifies and is usually designated by the particular predetermined wave length or frequency which is characteristic of a structural or functional group which is relatively unchanged during the condensation reaction.

Referring now to the drawings, FIG. 1 is a plot of limited infrared absorption spectrum for a reaction mixture sample taken during the production of the phenolic resole. The measured absorption values are plotted with wave length being the horizontal coordinate or abscissa and with percent transmission being the vertical coordinate. The illustrated absorption band spectrum is of a sample taken when about 9/10 of the cooking necessary to give a desired resole had taken place. To illustrate the determination of an adjusted infrared absorbence value as employed in the invention, there are shown on FIG. 1 a number of straight dotted lines extending upward from the horizontal coordinate at about 6.60 and 8.70 microns. In this illustration of the determination of an adjusted infrared absorbence value, the 6.60 micron band is the internal standard and the 8.70 micron absorption band is the band which changes as the course of the condensation reaction proceeds. For the determination of the base line absorbencies at 6.60 microns and 8.70 microns, dotted straight base lines joining two predominate spectral points located one on each side of each of these characteristic absorption bands are shown in FIG. 1. The vertical dotted line at 6.60 microns crosses the absorption band spectrum at about 18.2% absorption and the illustrated base line at about 36.0% absorption. The vertical dotted line at about 8.70 microns crosses the product absorption band spectrum at about 11.5% absorption and the illustrated base line therefor at 21.2% absorption. From these absorption values the base line absorbency at the 6.60 microns wave length calculates to be 0.296 and the base line absorbency at the 8.70 microns wave length calculates to be 0.266. The absorption coefficient (8.70 microns: 6.60 microns) is $$0.266 \div 0.296 = 0.9$$

FIG. 2 is a plot of infrared absorption spectrums of three samples of a reactant mixture. Each spectrum covers only a limited spectral range of about 6 to 9 microns wave length. Each sample was taken at a different intermediate stage of the production of a resole. A sample that had been cooked three hours at 110° F. gave the absorption band identified A. A sample that had been cooked three hours at 110° F. plus two hours at 140° F. gave the absorption band identified B. A sample that had been cooked three hours at 110° F. plus four hours at 140° F. gave the absorption band identified C. In the manner described above and illustrated in detail in the preceding paragraph, the base line absorbencies were calculated for each absorption band spectrum using the internal standard absorption band of about 6.60 microns, the characteristic chain structure absorption band at about 8.70 microns, and the characteristic end group absorption band of about 8.55 microns. The calculated adjusted infrared absorbence values follow:

| Sample | Adjusted infrared absorbence values | |
|---|---|---|
| | End group, 8.55:6.60 microns | Chain structure, 8.70:6.60 microns |
| A | 0.39 | 0.26 |
| B | [1] n.m. | 0.42 |
| C | [1] n.m. | 0.78 |

[1] N.m.=not measurable.

The above data illustrates progressive changes in values as the cooking cycle progresses for the end group and chain structure adjusted infrared absorbence values with the end group values diminishing and the chain structure values increasing as the cooking time increases.

FIG. 3 is a graphical plot of adjusted infrared absorbence values of samples of a reaction mixture at periodic intervals during the cooking to produce a resole. The plotted adjusted infrared absorbence values demonstrate that regular and progressive changes in values occur as the cooking cycle progresses. The 8.55:6.60 micron, or end group, adjusted infrared absorbence value progressively decreases, while the 8.70:6.60 micron, or chain structure adjusted infrared absorbence value progressively increases.

In the production of water-soluble phenolic resoles, it is often desirable that the cooking of a suitable reactant mixture be first at a relatively low temperature, and then at a high or higher temperature. Methylol phenol formation is favored during the initial low temperature cooking, while the later higher temperature cooking is conductive to cross linking of the methylol phenol intermediates. In the practice of the invention it is advantageous to employ an optimum cooking time; i.e. the minimum time which will give a required result. To this end, reaction mixture samples are taken periodically; the 8.55:6.60 micron adjusted infrared absorbence values determined; and the cooking temperature raised from the lower initial to the higher final in response to a determination that the value is about 0.5 or smaller. In the practice of the invention to employ the optimum cooking time at the higher cooking temperature and to produce resoles of substantially uniform quality and of substantially the same state of condensation, the cooking at the higher temperature is discontinued substantially immediately after the taking of a sample of the reaction mixture having 8.70–6.60 micron adjusted infrared absorbence value of about 1.2 or larger, and then the reaction mixture is quickly cooled.

In carrying forth the condensation of phenol and formaldehyde in accordance with the invention, samples of the reactant mixture are taken during the cooking. In response to a determination that the mixture has a particular adjusted infrared absorbence value, various reaction conditions, such as temperature and duration of cooking are changed, thus enabling condensation to proceed to the desired state to yield consistently a phenolic resin of a desired quality. The sample taking may be actual physical removal of small samples, usually a few drops, of the reaction mixture from the reaction kettle, vessel, production lines, or the like. Alternatively, the sampling may be a continuous sampling and may involve only a by-passing of a small portion of the reactant mixture through an appropriate bypass conduit from the reaction kettle, or apparatus, or the like, to a sample cell of the infrared absorption apparatus for determination of its infrared absorption spectrum with a subsequent return of the bypassed sample to the reaction kettle.

Apparatus and techniques for sample taking, such as removal or bypass sampling, and for taking of infrared absorption measurements are known. For a rapid and convenient practice of the invention, there desirably is employed an infrared photospectrometer which is equipped with automatic recording means, such as an electronic recording and tracing means for plotting and tracing the absorption band spectrum at the wave lengths of interest on a suitable chart. Suitable recording infrared photospectrometers are available from sources such as, the Perkin-Elmer Corporation, Norwalk, Connecticut; Baird Associates, Cambridge, Massachusetts; and Beckman Instrument Corporation, Fullerton, California, to mention only a few. Infrared techniques and the construction, theory and operation of such infrared apparatus is well known and amply taught in various publications. For example, see such references as: "Infrared Spectroscopy" by R. B. Barnes et al., 1944, Rheinhold Publishing Company, New York, N.Y.; "Analytical Absorption Spectroscopy" by M. G. Mellor, 1950, John Wiley & Sons, New York, N.Y., and in particular pages 439 to 514; and "The Infra-red Spectra of Complex Molecules" by L. J. Bellamy, 1958, John Wiley & Sons, New York, N.Y.

The terminology "substantially immediately" as used in the specification and appended claims, defines that interval of time necessary to determine the adjusted infrared absorbence value of a sample taken from the reaction mixture. This time interval may range from just a few seconds up to a substantial portion of one hour and is dependent not only on the particular infrared apparatus and technique used but also on the skill of the operator. With present-day commercially available apparatus and adequate use of instrumentation, sampling on a continuous basis is feasible (i.e. such as circulating a small proportion of the reactant mixture through a bypass conduit, a cell of the infrared absorption apparatus, and back to the reactant mixture) with both the sampling and determination of adjusted infrared absorbence values all being accomplished in a matter of only a few seconds. Even with manual extraction of a small sample of the reactant mixture and commercially available infrared photospectrometers, it is readily possible to sample the reactant mixture and to make an adjusted infrared absorbence value determination thereof in less than about twenty minutes.

The frequency with which samples are taken and adjusted infrared absorbence values thereof determined depends to a great deal on the latitude permissible relative to quality limits. Desirably the sample taking and determinations are made frequently and as rapidly as feasible and practical so as to provide an optimum control of the process and quality of the curable phenolic resin. Frequency of sampling may range from a continuous sampling to periodic sampling at erratic or definitely established periods of time. Thus, time intervals between sampling may approximate zero time for continuous sampling procedure to time intervals equal to fractional portions of the overall condensation time. Generally, the cooking or condensation reaction is carried forth for periods of time in excess of several hours in a customary preparation of a curable phenolic resin. In practice, sampling and determination of adjusted infrared absorbence values at time intervals of about one hour or somewhat less generally enables satisfactory control and changing of condensation reaction conditions to enable the obtaining of uniform quality curable phenolic resin. The process of the invention may be practiced where the sampling and determination of adjusted infrared absorbence values are not carried out on a continuous or on a definitely established periodic basis, but instead with sampling only over periods of time bracketing those portions of the cooking cycle where previous process runs have indicated changes in cooking conditions usually are made.

The examples which follow are to be construed as illustrative and not as limiting the scope of the invention beyond its true scope and spirit which is apparent from the application as a whole.

*Example I*

A resole was prepared from 202 pounds of formaldehyde (37 percent aqueous solution) and 94 pounds of phenol, with the catalyst being 2.7 pounds of sodium hydroxide. The reactants were charged to a 25 gallon reaction vessel, where they were thoroughly mixed and heated first at 110° F. and later at 140° F. The 110° and 140° cooking temperatures were maintained by conventional means. At approximately one hour intervals of time, commencing when the reactant mixture reached 110° F., small samples thereof were withdrawn from the vessel and neutralized with hydrochloric acid, placed in a barium fluoride cell of a Model 21 Perkin-Elmer infrared recording spectrophotometer, and the infrared absorption spectrum recorded for each sample. From the recorded infrared absorption spectra there were determined adjusted infrared absorbence values for end group and chain structure. The adjusted infrared absorbence values are shown in Table I.

TABLE I

| Sample No. | Cooking time, hours | Adjusted infrared absorbence values | |
|---|---|---|---|
| | | End group, 8.55:6.60 microns | Chain structure, 8.70:6.60 microns |
| 1 | 1 | 1.50 | n.m. |
| 2 | 2 | 0.745 | n.m. |
| 3 | 3 | 0.504 | 0.307 |
| 4 | 4 | 0.222 | 0.515 |
| 5 | 5 | 0.123 | 0.786 |
| 6 | 6 | 0.078 | 0.900 |
| 7 | 7 | [1] n.m. | 1.01 |
| 8 | 8 | n.m. | 1.07 |
| 9 | 9 | n.m. | 1.11 |
| 10 | 10 | n.m. | 1.14 |
| 11 | 11 | n.m. | 1.21 |

[1] n.m.=not measurable.

Sample No. 3 removed after three hours of cooking at 110° F. was found to have an end group adjusted infrared absorbence value of 0.504. Substantially immediately after Sample No. 3 was withdrawn from the reaction vessel, the cooking temperature was raised to 140° F., and cooking was continued at this higher temperature. The hourly sampling and adjusted infrared absorbence value determinations, as already noted, were continued. Sample No. 10 removed after ten hours cooking was found to have a chain structure adjusted infrared absorbence value of 1.14, so cooking was continued at 140° F. Sample No. 11, removed after 11 hours of cooking, was found to have a chain structure adjusted infrared absorbence value of 1.21. Substantially immediately after removal of Sample No. 11 and determination of its chain structure adjusted infrared absorbence value, that is with about 15 minutes after removal of the sample, the cooking was discontinued and the reaction mixture quickly cooled to 70° C. Sulfuric acid, a 30 percent aqueous solution, was then added in an amount to lower the pH to about 7.5.

The resole, thus prepared, had properties of:

| | |
|---|---|
| Specific gravity | 1.189. |
| Refractive index | 1.49. |
| Free formaldehyde | 3.5%. |
| pH | 7.45. |
| Solids | 47.43%. |
| Ash | 4.55%. |
| Dilutability | in excess of 1200%. |
| Cone efficiency | 66.1. |

Additional resoles may be prepared, sampled, and end group and chain structure adjusted infrared absorbence values determined, as in Example I. Intentional changes of the cooking temperatures employed in Example I simulates an erratic or faulty functioning of temperature controls employed in practice of the process. In accordance with the adjusted infrared absorbence values, the cooking times at various temperatures are shortened or lengthened to produce resoles of substantially the same properties as the resole produced by Example I. The following Table II presents typical data for a number of such resoles:

eleven hour cooking are green, under-condensed, and not advanced to the same extent of condensation as the resole of Example I, while in Examples II and IV, where the duration of the cooking cycle is lengthened to 13 hours in accordance with the taking of samples having particular adjusted infrared absorbence values, the resoles therefrom are the substantial equivalent of the resole prepared in Example I. Little or no change is realized in the physical properties of the comparison resoles from Examples III and V having an additional 1 hour of cooking at the final temperature, a total of 11 hours of cooking. In contrast thereto in Examples III and V employing a shorter cooking cycle, only a total of 10 hours of cooking, resoles the substantial equivalent of Example I are obtained. Thus, by following the method of the invention and raising the cooking temperature and halting the cooking substantially immediately after the taking of samples having particular predetermined adjusted infrared absorbence values, there may be realized an optimum cooking cycle and substantially uniform quality resoles.

The process of the invention, as described in the preceding specification and examples, has also been carried out with like results in the preparation of barium hydroxide catalyzed resoles, in the preparation of novolacs, and in the preparation of so-called tri-polymer curable phenolic resins, such as phenol-formaldehyde-urea resins and phenol-formaldehyde-melamine resins. Desirably in practice of the process of the invention in the prepara-

TABLE II

| Example No | II | | III | | IV | | V | |
|---|---|---|---|---|---|---|---|---|
| Cooking temperature, °C.: | | | | | | | | |
| Initial | 100 | | 120 | | 110 | | 110 | |
| Final | 140 | | 140 | | 130 | | 150 | |
| | IR.A.V.[1] E.G.[2] | IR.A.V. C.S.[3] | IR.A.V. E.G. | IR.A.V. C.S. | IR.A.V. E.G. | IR.A.V. C.S. | IR.A.V. E.G. | IR.A.V. C.S. |
| Cooking time, hours: | | | | | | | | |
| 1 | 1.6 | [4] n.m. | 1.4 | n.m. | 1.5 | n.m. | 1.5 | n.m. |
| 3 | .7 | n.m. | [5] .4 | .4 | [5] .5 | .3 | [5] .5 | .3 |
| 4 | [5] .5 | .3 | .2 | .6 | .3 | .4 | .2 | .6 |
| 10 | n.m. | 1.0 | n.m. | [6] 1.2 | n.m. | 1.0 | n.m. | [6] 1.2 |
| 11 | n.m. | 1.1 | | | n.m. | 1.1 | | |
| 12 | n.m. | 1.2− | | | n.m. | 1.2− | | |
| 13 | n.m. | [6] 1.2 | | | n.m. | [6] 1.2 | | |

[1] Adjusted infrared absorbency value.
[2] End grouping, 8.55:6.60 microns.
[3] Chain structures, 8.70:6.60 microns.
[4] Not measurable.
[5] Substantially immediately after taking this sample, the cooking temperature is raised.
[6] Substantially immediately after taking this sample, the cooking is discontinued and the resole quickly cooled.

Resoles prepared according to Examples II, III, IV, and V have properties of: a specific gravity between 1.180 and 1.188; a refractive index between 1.485 and 1.492; a free formaldehyde content between 3.0 and 4.0 percent; a pH between 7.45 and 7.55; and other properties as solids content, ash content, dilutability, and cone efficiency of about the same order of magnitude as the corresponding properties of the resole prepared in Examples I through IV after curing at normal curing conditions yield a substantially like cured, resite product.

For purposes of comparison to illustrate the advantages of the invention and not to illustrate the process of the invention, resoles prepared as in Examples II and IV may be withdrawn after only a total of 11 hours of cooking, and resole prepared as in Examples III and V may be cooked an additional hour at the final cooking temperature, or a total of 11 hours of cooking before cooling and neutralization to a pH of about 7.5. Each of such resoles, while cooked for 11 hours, the same length of time as the resole prepared in Example I, simulates altered initial or final cooking temptratures. The comparison resoles from Examples II and IV after an tion of phenol-formaldehyde-melamine resins, the melamine is added to the reactant mixture about the last hour of the cooking. In each of these preparations a curable resin of the desired properties was produced by a particular process run. Samples of the reactant mixture were taken at periodic intervals throughout this process run. From infrared absorption spectra of the samples, several distinctive characteristic absorption bands which altered or varied as the condensation reaction advanced were noted. At least one distinctive characteristic absorption band of a functional group which remained substantially unchanged during the condensation reaction was also noted. Adjusted infrared absorbence values were determined and a value was selected for each change of conditions in the particular process run yielding the desired curable resin. In subsequent additional process runs there were produced curable resins of substantially equivalent quality by cooking at a particular temperature until a sample was taken having approximately the particular selected predetermined adjusted infrared absorbence value. Substantially immediately thereafter the temperature was altered.

For example, in the production of a urea-phenol-formaldehyde curable resin, catalyzed with barium hydrate, characteristic infrared absorption bands at 8.55 and 8.70 microns were distinctly characteristic of changing functional groups during the condensation reaction and the infrared absorption band at 6.60 microns was distinctly characteristic and suitable as an internal standard absorption band which was relatively constant during the condensation reaction. In additional subsequent process runs for producing urea-phenol-formaldehyde curable resin, the 8.55:6.60 micron adjusted infrared absorbence value and 8.70:6.60 micron adjusted infrared absorbence value enabled satisfactory adjustment of cooking time at various cooking temperatures and adequate control of the condensation reaction to yield curable resins substantially identical with those produced in the initial process run.

The adjusted infrared absorbence values of the invention have also been found to be useful to determine whether reactants of substantially the same purity and substantially the same proportions as in earlier process runs are present in subsequent process runs. A variation in the ratio of two major reactants to each other in the reaction mixture creates a noticeable effect on the type and amount of intermediates formed in the reaction mixture, such as the major types and locations of substitutions taking place on the phenolic nucleus. A noticeable variation in a usual ratio of two adjusted infrared absorbence values to each other is indicative of a deficiency in the ratio of reactants. By comparison to previous ratios of the same two adjusted infrared absorbence values after the same amount of cooking of a previous process run yielding the desired curable resin, there may be detected erroneous additions of reactants and corrections made therefor. For example, a deficiency of formaldehyde concentration in a process for producing a resole was detected because the resole was noticeably greener and undercondensed as shown by a ratio of the end group to chain structure adjusted infrared absorbence values in this process run being higher than the ratio of the corresponding adjusted infrared absorbence values in a satisfactory process run at the same cooking times. Additional formaldehyde was added to the reaction mixture substantially immediately after at least one sample was taken showing the deficiency of formaldehyde, and cooking continued for an additional time until a sample was taken having the particular desired predetermined adjusted infrared absorbence value of the satisfactory process run. Substantially immediately thereafter the cooking temperature was raised. Then cooking was continued with samples of the reactant mixture being taken and adjusted infrared absorbence values determined. Substantially immediately after the taking of a sample having a desired predetermined chain structure adjusted infrared absorbence value, the reaction mixture was cooled with the resole obtained therefrom having properties substantially equivalent to the resole obtained in the satisfactory process run yielding the desired curable resin.

While the invention has been described and illustrated with particular reference to phenol and formaldehyde and particular curable phenolic resins, such as a phenolic resole, the process of the invention is applicable to processes of producing other phenolic resins, such as phenolic novolacs, modified phenolics, phenolic tri-polymer resins and the like. The invention also is applicable to processes producing curable phenol-formaldehyde-type resins from other than the illustrated reactants. Illustrative of such reactants conventionally used to replace formaldehyde in whole or in part are: paraformaldehyde, furfural, acetaldehyde, metaldehyde, tetraldehyde and the like. Illustrative of such reactants conventionally used to replace the phenol in whole or part are: various cresols, xylenols, resorcinal and the like.

It will be apparent that various changes and modifications may be made from the specific details disclosed herein and shown in the attached drawing, without departing from the true spirit and scope of the appended claims.

What is claimed is:

1. In a method for producing a curable phenol-aldehyde resinous condensation product, which method includes the mixing of reactants and a catalyst and cooking the resulting reactant mixture at an elevated temperature for condensation and formation of said product, the improvement which comprises:
    (1) taking samples of said mixture throughout the course of the reaction;
    (2) submitting said samples to infrared analysis to determine:
        (a) the wavelength of at least one infrared absorption band which characteristically changes during the reaction and,
        (b) the wavelength of at least one infrared absorption band which is characteristically constant during the reaction;
    (3) determining an adjusted infrared absorbence value as the quotient of the fraction wherein the numerator is the desired value of said band which characteristically changes during the reaction and the denominator is the value of said band which is characteristically constant during the reaction;
    (4) determining a plurality of said adjusted values during the reaction under given conditions and, taking at least one of such values as an indication of reaction to a desired extent under said conditions,
    (5) controlling a subsequent reaction of the same type and under the same conditions by periodically determining adjusted absorbence values during the course of said subsequent reaction and altering the reactant concentration and the time and temperature of cooking to substantially maintain the adjusted infrared absorbence value of said subsequent reaction to that value previously determined desirable.

2. The method of claim 1 wherein the desired value of said band which characteristically changes during the reaction is 8.55 microns and the value of said band which is characteristically constant is 6.60 microns and wherein the temperature of the reactant mixture is altered by raising the reactant mixture to a higher cooking temperature substantially immediately after the taking of and determination that a sample has an 8.55:6.60 micron adjusted infrared absorbence value of less than about 0.5.

3. The method of claim 1 wherein the desired value of said band which characteristically changes during the reaction is 8.70 microns and the value of said band which is characteristically constant is 6.60 microns and wherein the altering of the temperature of the reactant mixture is the cooling of the reactant mixture to a lower temperature substantially immediately after the taking of and determination that a sample has an 8.70:6.60 micron adjusted infrared absorbence value of more than about 1.2.

4. The method of claim 1 wherein the desired values of said bands which characteristically change during the reaction are 8.55 microns and 8.70 microns and the value of said band which is characteristically constant is 6.60 microns and wherein the altering of the temperature of the reaction mixture includes: raising the reactant mixture to a higher cooking temperature substantially immediately after the taking of and determination that a sample has an 8.55:6.60 micron adjusted infrared absorbence value of less than about 0.5; and cooling the reactant mixture to a lower temperature substantially immediately after the taking of and determination that a sample has an 8.70:6.60 micron adjusted infrared absorbence value of more than about 1.2.

5. In a method for producing a phenolic resole which method includes the steps of mixing phenol, formaldehyde and an alkaline catalyst to prepare a reactant mixture, cooking the mixture, and cooling the mixture when condensation has proceeded to the required extent, the improvement therewith comprising: heating the mixture to an initial cooking temperature conducive to addition of methylol groups to phenol; cooking at the initial cooking temperature; taking samples of the reactant mixture during the cooking of said reactant mixture, submitting said samples to infrared analysis to determine the value of (a) the 8.55 micron absorption band which indicates the desired addition of methylol groups to phenol and (b) the 6.60 micron absorption band which indicates an aromatic conjugated carbon to carbon double bond, determining an adjusted infrared absorbence value as the quotient of the fraction wherein the numerator is the value of said absorption band which indicates addition of methylol groups to phenol and the denominator is the value of said band which indicates aromatic conjugated carbon to carbon double bonds, determining a plurality of said adjusted values during the reaction under given conditions, during which time the initial cooking temperature has been raised to a higher cooking temperature conducive to condensation to the required extent, selecting at least one of said values, of less than about 0.5, as an indication of reaction to a desired extent under said conditions; and raising the initial cooking temperature of a subsequent reactant mixture of the same type to a higher cooking temperature conducive to condensation to the required extent substantially immediately after the taking of and determination that a sample of said subsequent reactant mixture has the selected 8.55:6.60 micron end group adjusted infrared absorbence value of less than about 0.5.

6. In a method for producing a phenolic resole which method includes the steps of mixing phenol, formaldehyde and an alkaline catalyst to prepare a reactant mixture, cooking the mixture at an initial cooking temperature conductive to addition of methylol groups to phenol, cooking additionally at a higher cooking temperature conducive to condensation to the required extent, and cooling the mixture, the improvement therewith comprising: taking samples of the reactant mixture during the cooking at the higher cooking temperature, submitting said samples to infrared analysis to determine the value of (a) the 8.70 micron absorption band which indicates the desired 2,4-, 2,6- and 2,4,6-substitution on the phenol nuclei and (b) the 6.60 absorption band which indicates aromatic conjugated carbon to carbon double bonds, determining an adjusted infrared absorbence value as a quotient of the fraction wherein the numerator is the numerical value of said band which indicates substitution on the phenol nuclei and the denominator is the numerical value of that absorption band which indicates aromatic conjugated carbon to carbon double bonds, determining a plurality of adjusted absorbence values during the reaction, selecting at least one of said values, of more than about 1.2, as an indication of reaction to a desired extent under said conditions; and cooling a subsequent reactant mixture of the same type and under the same conditions substantially immediately after the taking of and determination that a sample of said subsequent reactant mixture has the selected 8.70:6.60 micron chain-structure adjusted infrared absorbence value of more than about 1.2.

7. In a method for producing a phenolic resole which method includes the steps of mixing phenol, formaldehyde and an alkaline catalyst to prepare a reactant mixture, cooking the mixture at an initial cooking temperature conducive to addition of methylol groups to phenol, cooking additionally at a higher cooking temperature conducive to condensation to the required extent, and cooling the mixture, the improvement therewith comprising: taking samples of the mixture during the cookings at the initial and higher cooking temperatures, submitting said samples to infrared analysis to determine the value of (a) that absorption band at 8.55 microns which indicates the desired addition of methylol groups to phenol and that absorption band at 8.70 microns which indicates the desired 2,6-, 2,4- and 2,4,6-substitution on the phenol nuclei and (b) that absorption band at 6.60 microns which indicates aromatic conjugated carbon to carbon double bonds, determining adjusted infrared absorbence values as quotients of the fractions wherein the numerator in one of said fractions is the numerical value of said band which indicates addition of methylol groups to phenol, the numerator in the other of said fractions is the numerical value of said band which indicates 2,6-, 2,4- and 2,4,6-substitution and the denominator in each of said fractions is the numerical value of that band which indicates aromatic conjugated carbon to carbon double bonds, determining a plurality of such adjusted values during the reaction under given conditions, during which time the initial cooking temperature has been raised to a higher cooking temperature conducive to condensation to a desired extent and the reaction mixture has been cooled, selecting at least one of said values, of less than about 0.5, as an indication of reaction to a desired extent under said conditions and selecting at least one of said values, of more than about 1.2, as an indication that the reaction mixture should be cooled; heating a subsequent mixture to the higher cooking temperature substantially immediately after the taking of and determination that a sample of said subsequent reactant mixture has the selected 8.55:6.60 micron end group adjusted infrared absorbence value of less than about 0.5; cooking at higher temperature; and cooling the reaction mixture substantially immediately after the taking of and determination that a sample of said subsequent reactant mixture has the selected 8.70:6.60 micron chain-structure adjusted infrared absorbence value of more than about 1.2.

References Cited by the Examiner
UNITED STATES PATENTS

| | | | |
|---|---|---|---|
| 2,457,493 | 12/1948 | Redfern | 260—57 |
| 2,754,335 | 7/1956 | Bender et al. | 260—57 |
| 2,809,178 | 10/1957 | Turner et al. | 260—53 |
| 3,006,893 | 10/1961 | West et al. | 260—57 X |

WILLIAM H. SHORT, *Primary Examiner.*

PHILIP E. MANGAN, *Examiner.*